No. 782,550.

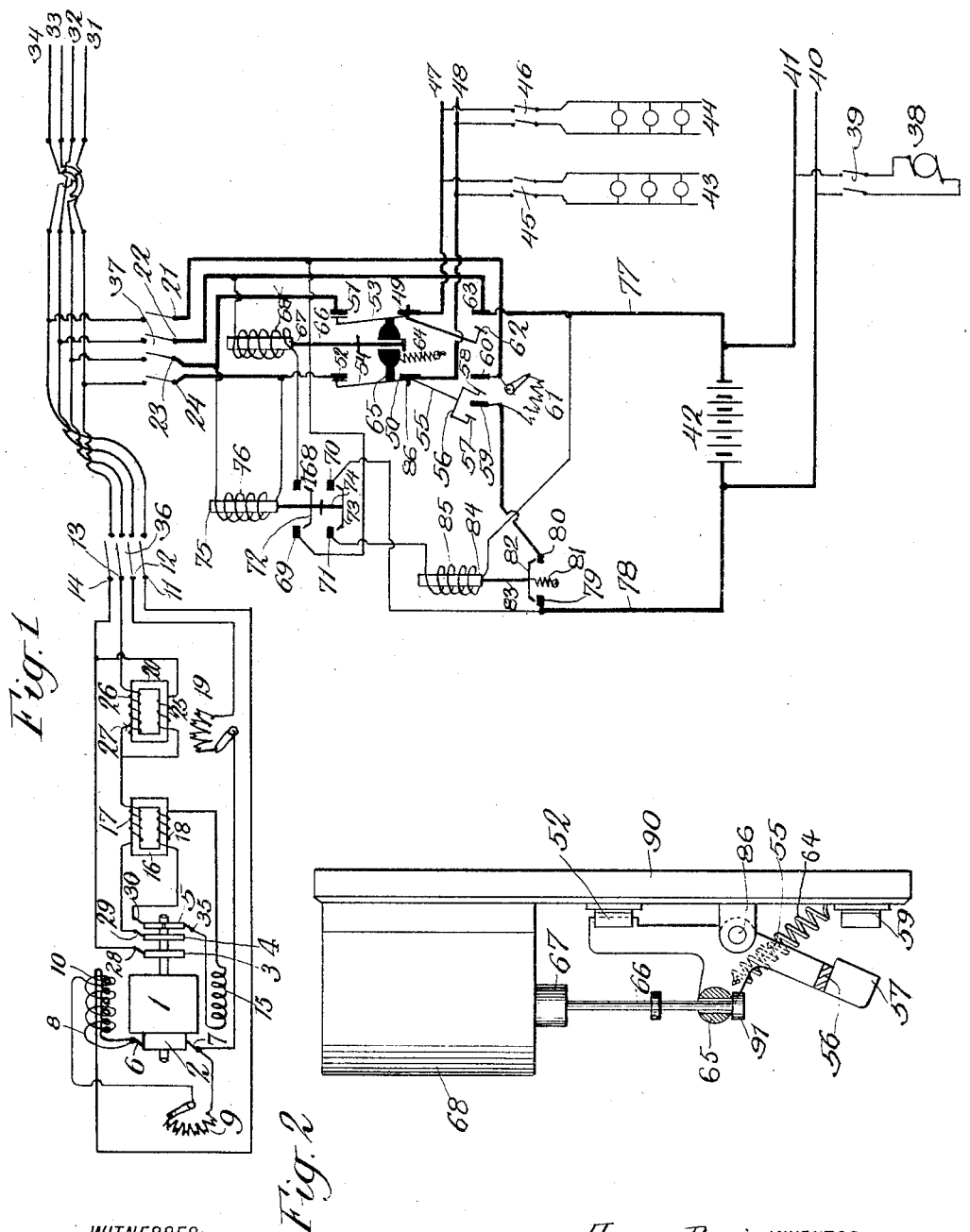

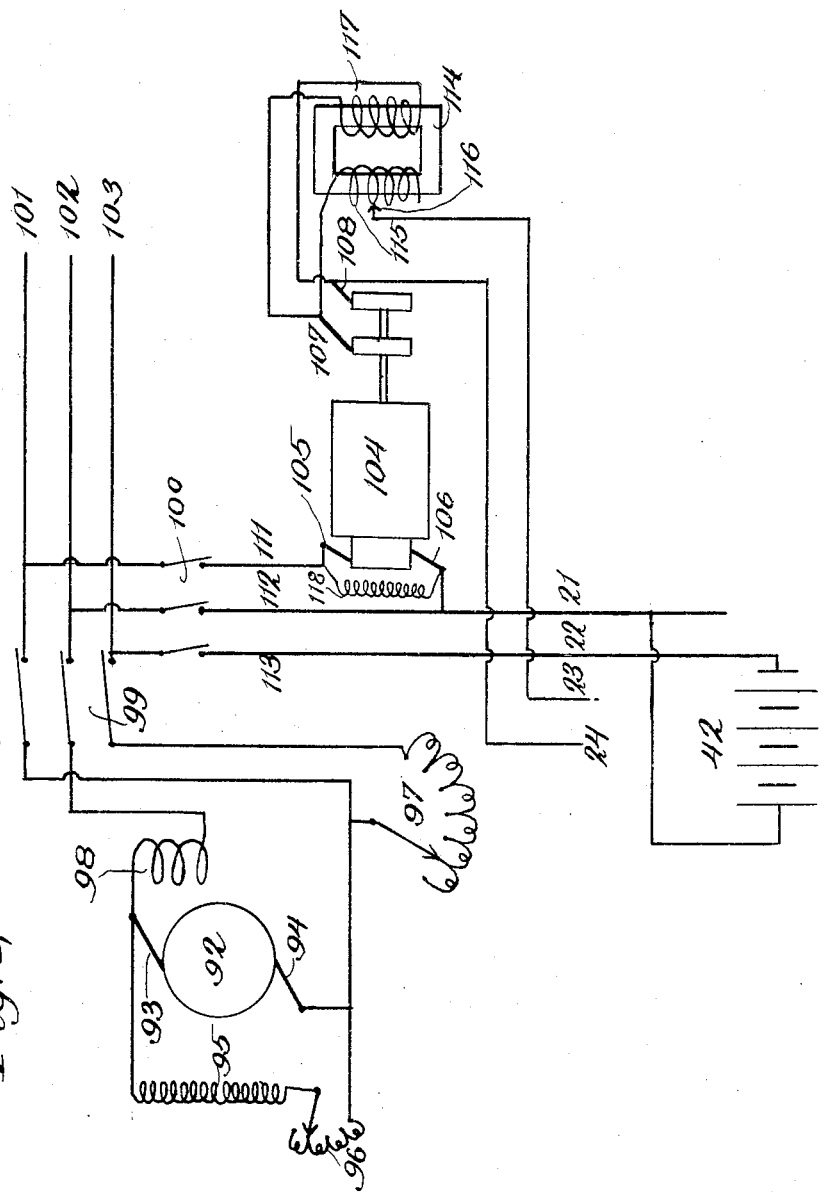

Patented February 14, 1905.

UNITED STATES PATENT OFFICE.

HORACE DOWIE, OF BROOKLYN, NEW YORK.

ELECTRIC SYSTEM.

SPECIFICATION forming part of Letters Patent No. 782,550, dated February 14, 1905.

Application filed April 19, 1904. Serial No. 203,828.

*To all whom it may concern:*

Be it known that I, HORACE DOWIE, a citizen of the United States, and a resident of the borough of Brooklyn, city of New York, county of Kings, and State of New York, have invented certain new and useful Improvements in Electric Systems, of which the following is a specification, taken in connection with the accompanying drawings, which form a part of the same.

This invention relates to electric systems, and relates especially to alternating direct-current systems which may be used for train-lighting or for other purposes.

In the accompanying drawings, in which the same reference-numeral refers to similar parts in the several figures, Figure 1 is a diagrammatic view showing an embodiment of this invention applied to train-lighting. Fig. 2 is an enlarged sectional view showing the throw-over switch. Fig. 3 is a diagrammatic view showing another embodiment of this invention applied to train-lighting.

In this invention an electric machine may be used to maintain a plurality of electric circuits at different electrical potentials, the circuit of higher potential being used to charge a storage battery and the load-circuit being connected with the circuit having the lower potential or being operated by the storage battery during the discharge of the same. An alternating direct electric machine may be employed to maintain a direct current and an alternating current of single or polyphase character in suitable lines. This electric machine may be in the form of a rotary converter or an alternating direct generator in which the alternating leads may be tapped into the direct winding of the machine. A suitable storage battery may be connected through switches of the desired construction with the direct-current circuits of the machine, and switches may be employed to supply the load-circuit either directly from the alternating circuit connected with the machine or from the storage battery by the discharge of the same.

In the embodiment of the invention indicated in Fig. 1 an alternating direct electric machine is employed, the armature 1 of this machine being provided with the commutator 2, from which the brushes 6 and 7 are supplied with direct current. The collector-rings 3 and 4 are connected with suitable leads which may be tapped directly into the direct-current winding of the armature or which may be connected with another winding, if desired. The contacts 28 and 29, which engage these rings, are thereby supplied with alternating current. In this case two collector-rings are shown and an ordinary single-phase alternating current is indicated as being furnished, although the alternating direct electric machine may be of suitable construction to supply polyphase electric current, if desired. The shunt-field 8 is indicated as connected to the brushes 6 and 7 in series with the shunt-regulator 9 of usual construction. The direct-current series field 10 is also connected with the brush 6 and the line leads out to the contact 11. The other brush, 7, is connected, through the battery-regulator resistance 19 with the contact 12. If desired, a suitable series transformer may be used in the alternating circuit, the transformer 16 being indicated for this purpose and the series winding 17 being connected with the contact 29, which engages the collector-ring. The secondary winding 18 of this transformer operates the alternating series field 15 of the electric machine, the alternating current from the winding 18 being turned into a direct current by a rectifier 5 of ordinary construction, which is indicated as provided with brushes 30 35. If desired, a suitable alternating potential-regulator 20 may be employed, this regulator being indicated as formed with the shunt-coil 25 and with the series coil 26, with which the adjustable contact 27 coöperates, so that any desired number of turns of this series coil may be connected in the circuit. This series coil, as indicated, is connected with the contact 13, and the contact 28, engaging the collector-ring, is also indicated as connected with the switch-contact 14.

Suitable switches 36, which may be of any desired construction and which may operate singly or in unison, are shown as connecting the corresponding switch-contacts in the main lines 31, 32, 33, and 34, which may run throughout the length of the system and may extend when the system is used in train-lighting throughout all the cars of the train, these lines being indicated as being formed with suitable crossovers or train-connectors, which may be provided at intervals, as is usual in this art. A suitable car-switch 37 is indicated, which may have any desired construction, and this switch is provided with contacts connected with the several main-line circuits. The switch elements are also indicated as connected with the contacts 21, 22, 23, and 24, which are the terminals of the circuits of the car equipment, each car on a train being preferably provided with an equipment such as is diagrammatically indicated in the lower part of Fig. 1.

The direct circuit of the car equipment comprises two lines connected with the switch-contacts 21 22. These lines are also connected with the contacts 60 63 of the automatic throw-over switch, the contacts 63 also being connected by the battery-leads 77 with one pole of the storage battery 42. Between the contacts 59 and 60 is located a suitable battery-regulating resistance 61, which may be adjusted in amount by the switch indicated, so as to suitably regulate the charging-current supplied to the storage battery. The contact 80 of the battery cut-out is connected with the contact 59, and the blade 82 of this cut-out is adapted to make connection with the other contact, 79, which, as indicated, is connected, through the battery-lead 78, with the other pole of the storage battery. If desired, the storage battery may be connected with a special direct-current load-circuit, which, as indicated, comprises the lines 40 41, which may supply power or other electrical energy, a direct-current motor 38 being indicated, which may be operated from this circuit through the switch 39.

The control-switch indicated comprises the solenoid-winding 76, connected in shunt across the alternating circuit between the contacts 23 24. A suitable core 75 is indicated coöperating with a solenoid and operating the switch-stem 74, to which the switch-blades 72 73 are connected. When this core and the connected switches are raised by reason of the alternating circuit being energized, electrical connection is made between the contacts 69 and 168 and 70 and 71. As soon, however, as the alternating circuit is not properly energized or becomes dead the core is allowed to fall, and these connections are broken. The automatic throw-over switch, which is adapted to shift the load-circuit from the alternating to the direct circuit, is indicated as comprising the solenoid 68. A suitable core 67 is shown within this solenoid and actuated thereby and as connected with the stem 66. This stem passes loosely through the bridge-piece 65 of the pivoted double-throw switch, and a suitable stud 91 on this stem is adapted to raise the bridge-piece, which otherwise is drawn downward under the influence of the spring 64. (See Figs. 1 and 2.) The two blades of this switch are pivoted about the pins 86 in the hinge-contacts 49 50, and when in the raised position indicated the arms 53 54 make electrical connection between the hinge-contact 49 and the contact 51 and connect the hinge-contact 50 with the alternating contact 52, the contacts 51 52 being connected, as indicated, with the contacts 23 and 24 of the car-switch. The solenoid 68 is energized by the direct circuit of the car whenever the contact-piece 72 of the control-switch is raised, so that the contact-piece 72 electrically connects the contacts 69 and 168. Whenever, therefore, the alternating car-circuit is properly energized the control-switch is raised, and the automatic throw-over switch is thereupon raised into the upward position indicated in Figs. 1 and 2, so that under these conditions the load-circuit 47 48, which is connected with the hinge-contacts, is thrown into electrical connection with the alternating circuit of the car. The load-circuit, as indicated, may comprise a number of lighting-lines 43 44, which may be connected with the load-circuit by suitable switches 45 46, or this load-circuit may supply electrical energy for utilization in any other desired way.

Under the above conditions, the switches 36 37 being of course normally closed, a direct current is supplied from the alternating direct electric machine through the direct-current main lines 31 32, running throughout the train and to the direct circuit 21 22 of each car. This direct current passes along the line from the contact 21 through the battery-regulating resistance 61 across the battery cut-out 82, this contact being normally drawn into closed position by the spring 81 and into the battery through the lead 78. The other pole of the battery is connected, through the lead 77, with the contact 22, as indicated, so that under these conditions the storage battery is being charged from the direct circuit of the alternating direct electric machine. When this battery is fully charged, the counter electromotive force becomes sufficient to energize the solenoid 85 of the battery cut-out, thus raising the stem 83 and the contact-piece 82 connected therewith, so that electrical connection is broken between the contacts 79 and 80, and the charging-circuit of the battery is thus interrupted. If, however, the alternating circuit becomes dead through the stopping of the main alternating direct electric machine, or if for any cause the alternating circuit of the car is not properly energized at any time, the control-switch falls, since its solenoid is no longer sufficiently actuated by the alternating current from the alternating car-circuit. This control-switch under theses conditions breaks the electrical connection between the contacts 69 and 168, thus deënergizing the solenoid of the automatic throw-over switch, this switch being then drawn downward by the spring 64, so that the lower blades bring their contacts into engagement with the coöperating stationary contacts, the contacts 57 59 being brought into engagement by the action of the spring in an obvious manner. (See Fig. 2.) This throw-over switch in its lower position short-circuits the battery-regulating resistance 61 and also connects the load-circuit having terminals in the hinge-contacts with the battery-leads, the contact 49 being electrically connected with the contact 63 and the contact 50 being electrically connected through the blade members 55 56 with the contacts 59 60. Under these circumstances the load-circuit is operated from the storage battery by its discharge in the ordinary manner, the battery cut-out of course being drawn down by its spring 81 at this time, so as to make electrical connection between the contacts 79 and 80, this being brought about by the fact that the control-switch has severed the electrical connection through the solenoid 85 of the battery cut-out. The automatic switches may be actuated from the direct-current car-lines for this purpose, and a suitable control-switch may be connected thereto, or, if desired, these automatic switch devices may be otherwise connected to control the operations of the system.

When in this system the operation of the alternating direct electric machine 1 is stopped, each storage battery in the several cars is automatically thrown into electrical contact with the load-circuit in that car and also is electrically connected with the direct-current circuit 31 32, running throughout the length of the train. In this way all the storage batteries are connected in parallel throughout the whole train, and their action is thus equalized in feeding the load-circuits in the several cars. It is of course understood that under these conditions the direct circuit 31 32, running throughout the train, may be disconnected from the armature of the alternating direct dynamo by an automatic switch of any desired description, such as is well known in this art. Indeed, the train-switch 36 may be provided with suitable automatic devices to break the direct train-circuit when the generator is not properly operated.

When the generator is in operation, the automatic switches throw the load-circuit onto the alternating circuit in each car and also connect the storage battery of each car with its direct circuit, so that each battery may be supplied with current until it is properly charged. It should be noted that when the alternating leads are tapped directly into the direct-current winding of the alternating direct electric machine the direct current produced has a considerably greater voltage than the alternating current, and this greater voltage of the direct current is substantially sufficient to charge a storage battery of such size as will give the proper voltage during its discharge to operate the load-circuit. This discharge-potential of the storage battery is substantially equal under ordinary conditions to the effective voltage of the alternating circuit supplied from the alternating direct electric machine, its alternating circuit having a lower potential than the direct-current circuit. Very little energy is therefore wasted in adjusting these voltages, and an efficient operation is secured.

Although it is usually desirable to operate the system so that the alternating direct electric machine supplies the load-circuit with alternating current when the machine is running, yet this is not necessary in all cases. Under some conditions it is desirable that the load-circuit be supplied with direct current from the machine, and under these conditions the batteries may also supply current and may in this way compensate for any fluctuations in the load, the batteries being charged from the generator under conditions of light load. The use of a suitable resistance in the circuit of the machine will tend to limit the amount of current supplied directly by the machine to the load-circuit and to keep a comparatively constant load upon the machine, while the fluctuations in the load are taken care of by the batteries.

If desired, the alternating direct electric machine need not be operated by mechanical power, as is indicated in the modified construction shown in Fig. 3. In Fig. 3 the armature 104 of the alternating direct electric machine is provided with the direct-current brushes 105 and 106, which engage a suitable commutator, and the contacts 107 and 108 engage the collector-rings, which may be connected with leads tapped directly into the direct-current circuit of the armature. As indicated, the field 118 of the machine is in shunt across the brushes 105 106. If direct current is supplied to the electric machine, it operates in a well-known manner as a rotary converter and maintains the potential of the alternating direct circuits the same as when the machine is mechanically operated, as is shown in Fig. 1. A generator is indicated for supplying direct current to the rotary converter, (shown in Fig. 3,) this generator comprising the armature 92, having the brushes 93 and 94. The shunt-field 95 is in series with a suitable regulator 96, connected to the two brushes, and the series field 98 is connected with the brush 93 and is also connected through a suitable switch 99 with the line 102. The other brush, 94, is connected, through the switch mentioned, with the line 101 and is also connected, through the adjustable regulator, with this switch 99 and to the line 103. These lines 101, 102, and 103 would in a train-lighting system extend throughout the several cars, and each car may be provided with a car-switch 100 of any desired construction to normally maintain electrical connection between the main train-lines and the car-lines 111, 112, and 113. If desired, another train-wire may be connected with the brush 93 of the generator, so that two separate circuits in that case would extend throughout the train, one circuit supplying the batteries, and in such case the train connections would correspond more closely to what is indicated in Fig. 1. The wires 111 and 112 are connected with the brushes of the alternating direct electric machine, so as to operate it and to maintain an alternating current, which is taken off by the collectors 107 and 108. A suitable alternating-current regulator 114 may be employed, if desired, the coil 117 of this regulator being indicated as in shunt between the collectors 107 and 108, and the adjustable series coil 115 is indicated as connected with the collector 107 and with the adjustable contact-piece 116, by which any desired number of turns of this series coil may be put in circuit with the line 23, the line 24 being connected, as indicated, with the other alternating collector 108. These four lines 21, 22, 23, and 24 constitute the direct and alternating car-circuits and may be connected with the automatic switching apparatus indicated in Fig. 1, and such a car equipment would have the same operation as has been described, the storage battery 42 being automatically charged and serving when the alternating circuit is not energized to operate the load-circuit.

It is of course understood that those familiar with this art may make many variations in the form, proportions, construction, and numbers of parts of the apparatus constituting this system, parts of the same may be omitted, and parts may be used in connection with other devices without departing from the spirit of this invention or losing the advantages of the same. I do not, therefore, desire to be limited to the details of the disclosure which has been made in this case; but

What I claim as new, and what I desire to secure by Letters Patent, is set forth in the appended claims:

1. In electric systems, an alternating direct electric machine, main lines connected with said machine to extend throughout a system; and equipments to be connected with said main lines comprising direct circuits and alternating circuits, a storage battery connected to said direct circuit, a load-circuit to be operated, and automatic means comprising a control-switch connected to said alternating circuit to throw said load-circuit into connection with said direct circuit or with said alternating circuit.

2. In electric systems, an alternating direct electric machine, main lines connected to said machine extending throughout the cars of a train system; and car equipments comprising direct circuits and alternating circuits to be connected with said main lines, a storage battery connected with said direct circuit, a load-circuit and automatic means comprising a control-switch connected to said alternating circuit of the car to throw said load-circuit into connection with said alternating circuit or with said direct circuit.

3. In electric systems, an alternating direct electric machine, main lines connected to said machine and extending throughout the cars of a train system; and car equipments comprising a direct circuit, an alternating circuit, a storage battery in circuit with a battery cut-out and connected to said direct circuit, a control-switch energized from said alternating circuit and controlling said battery cut-out, an automatic throw-over switch, a load-circuit connected to said throw-over switch to be thereby connected with said alternating circuit or said direct circuit, said throw-over switch being controlled by said control-switch.

4. In electric systems, an alternating direct electric machine, comprising an armature in which the alternating leads are directly tapped into the direct-current winding, a storage battery, a load-circuit, and automatic means comprising a switch operated from the alternating circuit of said machine to electrically connect said load-circuit to the alternating circuit of said machine or to said storage battery and to connect said storage battery with the direct circuit of said machine.

5. In electric systems, a machine to maintain a plurality of circuits at different electrical potentials, a storage battery, a load-circuit, means to charge said storage battery from the circuit connected to said machine and having the higher potential and automatic switches controlled by the potential of the supply-circuit having the lower potential to connect said load-circuit with said storage battery or with the circuit connected to said machine and having the lower potential.

6. In electric systems, an alternating direct electric machine comprising an armature in which the alternating leads are directly tapped into the direct-current winding, direct circuits and alternating circuits, a storage battery to be connected with said direct circuit an electrical load and automatic means comprising a control-switch connected to said circuit to throw said load into connection with said alternating circuit or with said direct circuit.

7. In electric systems, an alternating direct electric machine, direct circuits and alternating circuits, a storage battery connected with said direct circuit, an electrical load and automatic means comprising a control-switch connected to said circuits to throw said load-circuit into connection with said alternating circuit or with said direct circuit.

8. In electric systems, an alternating direct electric machine, a direct circuit, an alternating circuit, a storage battery connected to said direct circuit, a control-switch connected with said circuits, an automatic throw-over switch, an electrical load connected to said throw-over switch to be thereby connected with said alternating circuit or said direct circuit, said throw-over switch being controlled by said control-switch.

9. In electric systems, a direct circuit, an alternating circuit, a storage battery connected with said direct circuit, a control-switch connected with said circuits, an automatic throw-over switch, an electrical load connected to said throw-over switch to be thereby connected with said alternating circuit or said direct circuit, said throw-over switch being controlled by said control-switch.

10. In electric systems, a direct circuit, an alternating circuit, a storage battery connected with said direct circuit, a control-switch connected with said alternating circuit, an automatic throw-over switch, an electrical load connected to said throw-over switch to be thereby connected with said alternating circuit or said direct circuit, said throw-over switch being controlled by said control-switch.

11. In electric systems, main lines extending throughout the cars of a train system and comprising an alternating line and a direct line of higher potential; and car equipments comprising a direct circuit, an alternating circuit, a storage battery in circuit with a battery cut-out and connected with said direct circuit, an automatic control-switch connected with said circuits and actuated thereby, an automatic throw-over switch, an electrical load connected to said throw-over switch to be thereby connected with said alternating circuit or with said direct circuit and said throw-over switch being controlled by said control-switch.

12. In electric systems, main lines extending throughout the cars of a train system and comprising an alternating line and a direct line of higher potential; and car equipments comprising a direct circuit, an alternating circuit, a storage battery connected with said direct circuit, an electrical load and automatic means comprising a control-switch connected to and actuated by said alternating circuit to throw said load into connection with said alternating circuit or with said direct circuit.

13. In electric systems, a direct circuit, an alternating circuit, a storage battery to be connected with said direct circuit, a pivoted automatic throw-over switch having blades permanently connected to hinge-contacts, an electrical load connected to said hinge-contacts, a control-switch comprising a solenoid connected in shunt across said alternating circuit, said throw-over switch being normally held in position to connect said load with said storage battery and said throw-over switch comprising a solenoid in circuit with said control-switch and operated thereby to connect said load with said alternating circuit when said alternating circuit is properly energized.

14. In electric systems, an alternating circuit, a direct circuit of normally higher potential, an automatic control-switch comprising a solenoid connected to said alternating circuit, an automatic throw-over switch comprising movable contacts permanently connected with fixed contacts, a storage battery connected to contacts coöperating with the movable blades of said throw-over switch and connected with said direct circuit and said battery comprising a charging-circuit, having a battery cut-out and connected with said control-switch, said throw-over switch comprising a solenoid energized through said control-switch and throwing said load into connection with said alternating circuit when said circuit is properly energized, said control-switch being normally drawn into contact to throw said load into connection with said direct circuit and said storage battery when said alternating circuit is not properly energized.

HORACE DOWIE.

Witnesses:
HARRY L. DUNCAN,
JESSIE B. KAY.